Dec. 28, 1965  G. C. COVERSTON  3,225,539

EXPLOSION INERTIA TURBINE ENGINE

Filed June 20, 1962  5 Sheets-Sheet 1

INVENTOR.
GEORGE C. COVERSTON

BY Le Blanc & Shur

ATTORNEYS.

Dec. 28, 1965    G. C. COVERSTON    3,225,539
EXPLOSION INERTIA TURBINE ENGINE
Filed June 20, 1962    5 Sheets-Sheet 2

INVENTOR.
GEORGE C. COVERSTON
BY *Le Blanc & Shur*
ATTORNEYS

Dec. 28, 1965  G. C. COVERSTON  3,225,539
EXPLOSION INERTIA TURBINE ENGINE
Filed June 20, 1962  5 Sheets-Sheet 4

FIG. 10

INVENTOR.
GEORGE C. COVERSTON
BY *Le Blanc & Shur*
ATTORNEYS.

Dec. 28, 1965  G. C. COVERSTON  3,225,539
EXPLOSION INERTIA TURBINE ENGINE
Filed June 20, 1962  5 Sheets-Sheet 5

INVENTOR.
GEORGE C. COVERSTON
BY Le Blanc & Shur
ATTORNEYS

United States Patent Office 3,225,539
Patented Dec. 28, 1965

1

3,225,539
EXPLOSION INERTIA TURBINE ENGINE
George C. Coverston, 76 S. Russell St., Fallon, Nev.
Filed June 20, 1962, Ser. No. 203,890
11 Claims. (Cl. 60—39.75)

This invention relates to improvements in an internal combustion gas turbine engine.

It is a principal object of the present invention to provide a novel explosion inertia turbine engine in which an exploded fuel charge is directed through an outlet of the firing chamber in such manner that the gas will increase in velocity and impinge on a rotor blade so that the full force of inertia of the exploded gas is used as a source of work output from the turbine engine. It is another related object of this invention to provide a novel explosion inertia turbine engine in which the force of inertia of the exploded gas is imparted to the rotor in such manner as to utilize available kinetic energy.

It is another object of the present invention to provide a novel firing unit and valve construction designed to cause the exploded gases to be directed to the turbine rotor blades for utilization of the force of inertia and potential energy of the exploded fuel-air charge. It is a related object of this invention to provide a firing chamber and valve construction with gas exit throat which are so designed as to cause virtually all of the exploded gases to be impelled substantially in one direction on the shortest straightest unobstructed course to the impact surfaces of the turbine rotor blades, with optimum exposure of turbine blade surfaces substantially at right angles to the course of the exploded gas particles, whereby practically all force of inertia of the exploded gas particles is used in driving the rotor. It is still another related object of this invention to provide an explosion inertia turbine engine incorporating a novel firing chamber and rotor arrangement whereby the fuel is exploded at an optimum location in relation to the firing chamber outlet and rotor blades utilized to drive the rotor.

It is yet another object of the present invention to provide such a novel explosion inertia turbine engine which may incorporate one or a multiplicity of firing units for combustion of fuel to drive the turbine wheel so as to meet varying load conditions. It is another related object of this invention to provide a form of explosion inertia turbine engine according to the present invention which is so constructed that each firing chamber is an independent unit which can be readily removed, thus permitting replacement of the unit or quick repair when faulty.

It is another related object of the present invention to provide an explosion inertia turbine engine with novel firing chamber and valve arrangement which permits a large number of explosions per minute without deleterious effects.

It is another object of the present invention to provide a novel explosion inertia turbine engine which can be operated at varying compression ratios, as desired, with high compression under load and low compression for idling, for more efficient operation under varying load conditions.

It is another object of the present invention to provide a novel turbine engine which is of uncomplicated construction and has a minimum number of parts, whereby the engine can be manufactured economically and will

2 have a minimum of friction, wear and maintenance problems. Specifically, it is an object of this invention to provide an explosion inertia turbine engine in which the firing chamber valves and turbine rotor and its bearings are the only moving parts. It is a related object of this invention to provide a novel explosion inertia turbine engine which may use a variety of fuel, and does not need special fuels like high octane gasoline.

Still other objects and advantages of the present invention will be apparent from the following description thereof with reference to the accompanying drawings and appended claims.

It is noted that in the drawings and following description, like elements are identified by like numerals throughout. In discussing the modifications of FIGURES 8–9, FIGURES 11–11A, and FIGURES 12–13, certain modified elements are identified with like numerals as in FIGURES 1–7 plus subscripts as below amplified; it is noted that the subscript $a$ is used in the modification of FIGURES 8–9, the subscript $b$ is used in the modification of FIGURES 12–13, and the subscript $c$ is used in the modification of FIGURES 11–11A.

Referring to FIGURES 1–7, there is shown at 20 an explosion inertia turbine engine according to the present invention which incorporates in the illustrated embodiment four firing units, each generally indicated by the numeral 22. It is noted that in FIGURE 1, one of the firing units is omitted (at the nine o'clock station) to permit a clearer showing of the rotor and other internal components of the turbine 20 hereinafter more fully described. It is also noted that in FIGURE 1, the upper portion of one of the firing units 22 is omitted (at the twelve o'clock station) to permit a clearer showing of the lower firing chamber half of firing unit 22, which is hereinafter more fully described.

Still referring to FIGURES 1–7, and particularly to FIGURES 1–4, the explosion inertia turbine engine 20 comprises a lower turbine housing section generally indicated at 24, and an upper turbine housing section generally indicated at 26, and an interposed peripheral annular turbine housing wall generally indicated at 28. A turbine rotor generally indicated at 30 is rotatably mounted within the turbine housing 24–26–28 by means of thrust bearings 32, and a pair of shafts 34 and 36 are non-rotatably secured to the turbine rotor 30 and extend from the engine housing for power take-off from the turbine rotor 30. The turbine engine housing sections 24, 26 and 28, the rotor 30, shafts 34 and 36, and bearings 32 have a configuration and construction as shown in the drawings and as amplified below in detailed discussion of some of these components.

The lower engine housing section 24 comprises a main annular and substantially laterally extending wall portion 38 which has a central hub section 40 extending substantially perpendicular therefrom. Hub 40 has at its outer end a laterally extending external flange 42 and an internal laterally extending flange 44. The externally extending flange 42 is provided with a plurality of apertures 46 for passage of bolts 48 by which the turbine 20 is mounted on any suitable base or supporting means schematically shown and generally indicated at 50 in FIGURE 3. The inwardly extending flange 44 provides a shoulder 52 for seating the outer race 54 of tapered roller thrust bearing 32, the inner race of which supports rotor output shaft 36. The lower turbine engine housing section 24 is cast and machined with a configuration as shown and described using known techniques.

Referring now to the upper housing section 26, this comprises a main annular and laterally extending wall portion 58 which has a central hub portion 60 extending substantially perpendicular therefrom. The central hub 60 of the upper turbine housing section 26 is enclosed by means of an annular cover plate 62 secured to the annular upper end of hub 60 by a plurality of cap screws 64 extending through apertures in annular plate 62 and secured in corresponding threaded apertures in hub section 60. As will be apparent, this provides a shoulder 66 for seating of the outer race 68 of a second roller thrust bearing 32, the inner race of which receives drive output shaft 34.

The drive output shaft 34 is provided at one end with an enlarged flange 35 whereby shaft 34 is coaxially mounted on one side of rotor 30 by a plurality of cap screws 37 extending through apertures in drive shaft flange 35 and corresponding threaded apertures in the adjacent central hub portion of rotor 30. Similarly, the drive output shaft 36 is provided at one end with a flange 39 which is secured to the adjacent portion of the rotor 30 by a plurality of cap screws 41 extending through apertures in drive shaft flange 39 and corresponding threaded apertures in the adjacent central hub portion of rotor 30.

The peripheral engine housing wall 28 comprises a generally annular member which is provided with a plurality of apertures 33 at arcuately spaced intervals. The laterally extending wall portions 38 and 58 of bottom and top housing sections 24 and 26, respectively, are provided along their periphery with a plurality of apertures corresponding to apertures 33 so that the peripheral edges of top and bottom housing sections 24 and 26 are secured to annular housing wall member 28 by a plurality of bolts and nuts 74 to thus form the complete housing for rotor 30, as will be apparent from examination of FIGURES 1 and 3, and also FIGURE 9. If desired, suitable gaskets can be provided between the abutting edges of peripheral annular side housing member 28 and the lower inside peripheral portions of lower and upper housing sections 24 and 26.

At this point, it is noted that the annular member 28 which forms the side wall of the turbine housing is also provided with four apertures 78 extending laterally therethrough for the purpose of ejecting gases from the turbine engine 20, as hereinafter amplified. (See FIGURES 1, 2 and 4, and also FIGURE 9.)

Figure 1:
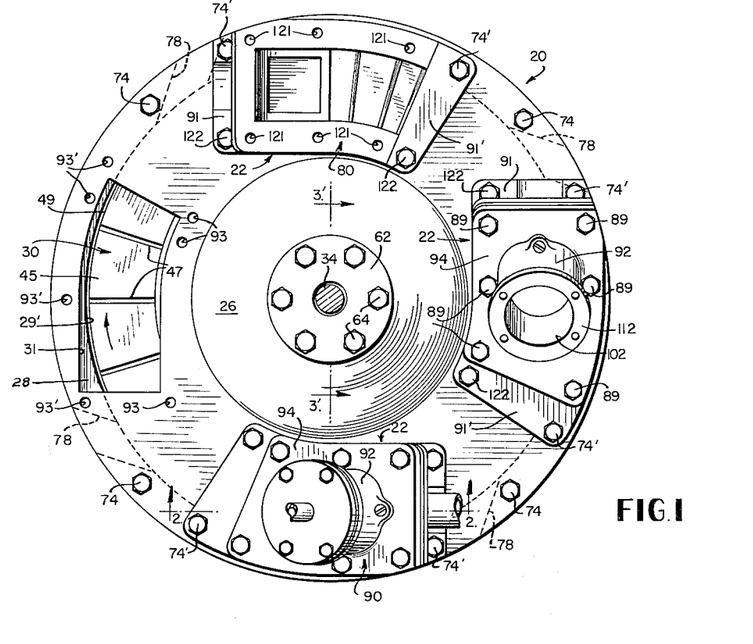
FIGURE 1 is a top plan view of one embodiment of an explosion inertia turbine engine according to this invention, with certain parts of described firing units omitted for a clearer showing (the engine being disposed horizontally for convenience of description)
Figure 2:
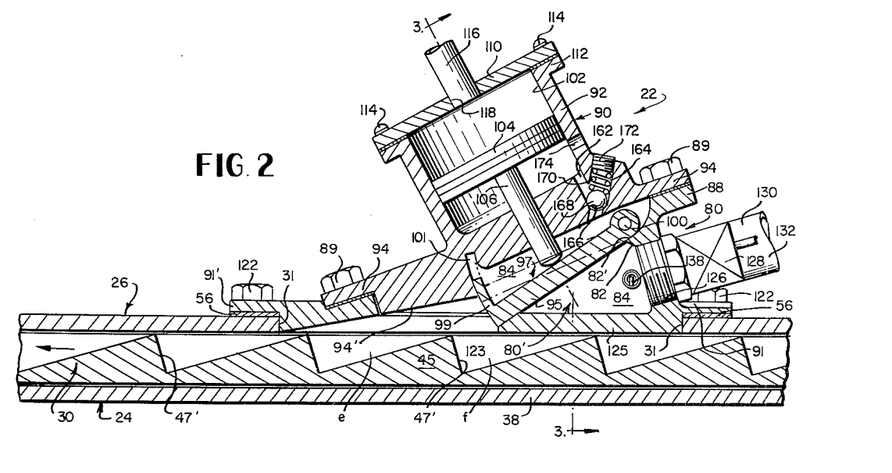
FIGURE 2 is a vertical sectional view taken along line 2—2 in FIGURE 1, and especially showing one of the engine firing units including its firing chamber, flat valve, etc., and a cooperating portion of the rotor, etc.
Figure 3:
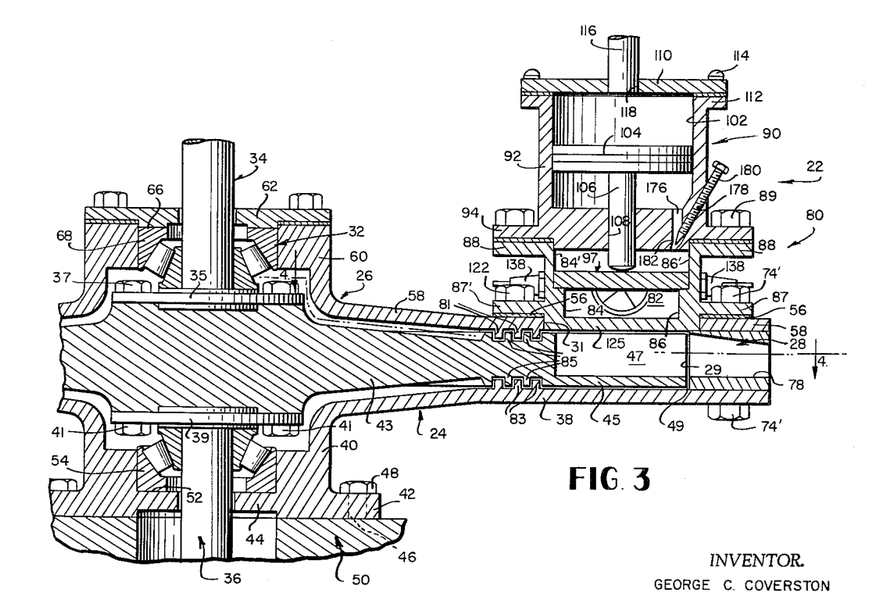
FIGURE 3 is a vertical sectional view taken through one of the firing units along line 3—3 in FIGURE 2, and also showing in fragmentary vertical cross-section the central portion of the engine along line 3'—3' in FIGURE 1.

Referring to FIGURES 1, 2 and 3, it is also noted at this point that the top housing section 26 differs from the bottom housing section 24 in that the laterally extending wall portion 58 of top housing section 26 is provided with four apertures 31, each of which is adapted to receive the lower part of one of the firing units 22, overlying the bladed section of rotor 30 to which particular reference is now made.

The rotor 30 comprises a central wheel portion 43 and an annular peripheral blade portion 45 which has a plurality of radial blades 47 formed therein, but not extending therethrough; blades 47 are constructed in a particular manner and have a particular relation to firing units 22 as hereinafter discussed in detail. It will be noted (especially from FIGURES 1 and 3) that a slight clearance 49 is provided between the peripheral edge of the annular rotor blade portion 45 and the inside surface 29' of the annular side housing ring 28, whereby there is sufficient clearance for rotation of the rotor within the housing 24–26. Referring especially to FIGURE 3, the inside wall 58 of upper housing section 26 is provided with inwardly extending spaced annular projections 81, and the inside wall 38 of the lower housing section 24 is provided with like inwardly extending projections 83, said projections 81 and 83 being concentric with the axis of the turbine. The turbine rotor 30 is provided with outwardly extending annular projections 85 which mate with housing projections 81 and 83 as shown in FIGURE 3 to form a labyrinth seal that prevents passage of gas from peripheral rotor blade section 45 back towards the axial portion of rotor 30. (Since such labyrinth seals are well known in the gas turbine field, additional detailed showing or discussion thereof is deemed unecessary.)

Referring now to the firing units 22 of engine 20, and particularly to FIGURES 1–3 and 5, each of the firing units 22 has a lower firing chamber section 80, and an upper subassembly 90.

Each lower firing chamber section 80 comprises a slanting back wall 82 and side walls 84 and 84' opposite like side walls 86 and 86' as shown in FIGURES 2, 3, 5 and 7. Each lower firing section 80 is provided with side flanges 87 and 87' and end flanges 91 and 91'. (See FIGURES 1–3 and 5–7.) Each lower firing section 80 is seated on upper housing 26 with lower portions thereof seated in one of apertures 31, and with a gasket 56 on housing plate 58 surrounding the aperture 31 below flanges 87, 87', 91 and 91'. Lower firing section 80 is secured to plate 58 by means of a plurality of cap screws 122 extending through apertures in flanges 87', 91 and 91' and corresponding threaded apertures 93 in upper housing plate 58. Section 80 and other portions of turbine housing 24, 26, 28 are secured by a plurality of bolts 74' extending through apertures in outer side flange 87, apertures 93' in upper housing plate section 58, apertures 33' in outer ring 28, and corresponding apertures along the periphery of lower housing plate section 28, bolts 74' being secured with nuts in conventional manner. It is noted that those bolts which are below flange 87 are inserted from the underside of housing plate 38 and secured by a nut between flanges 87 and 88, since the spacing between these flanges is not sufficient for insertion of these bolts from the top. (See FIGURES 1 and 3.) Thus, the interior of lower firing chamber section 80 may be in communication with blade section 45 of rotor 30 for direction of exploded gases against rotor blades 47 as hereinafter amplified.

The walls 82, 84 and 86 of the lower chamber section 80 of firing unit 22 are provided at their upper ends with a peripheral laterally extending flange 88 on which there is mounted the previously mentioned upper subassembly 90 of the firing unit 22. The upper firing unit subassembly 90 comprises a main section cast and machined to provide a configuration as shown in the drawings, including a base portion 94 and a substantially cylindrical portion 92 rising from the base section 94. The base portion 94 is secured to lower firing chamber section 80 by means of cap screws 89 passing through apertures 120 in its base section 94 and corresponding threaded apertures 121 in flange 88.

The lower section 80 of the firing unit 22 is provided with an internal recess between walls 84' and 86' which is adapted to receive a combustion chamber flat valve 97 that is pivotally mounted at one end on a pin 100 extending transversely across the end of said recess with ends mounted in apertures 100' in side walls 84' and 86'. (See FIGURES 2, 3, 5 and 7.) It will be noted that the flat valve 97 is of generally L-shaped cross-section and includes a main portion 95 and short arcuate end portion 99. The underside of firing unit section 90 is provided with a recess indicated at 101 to accommodate leg 99 of the flat valve 97; and section 99 of flat valve 97 and recess 101 are similarly arcuately formed as shown in FIGURE 2 to permit flat valve 97 to freely pivot about pin 100 without binding, during the operation of firing unit 22 which is hereinafter more fully described. (Note: Flat valve 97 is sometimes also referred to as a flap valve.)

The upper part of the substantially cylindrical portion 92 of subassembly 90 is provided with an internal cylinder 102 in which there is reciprocably disposed a piston 104 having a rod or plunger 106 that extends through a bore 108 and engages the main portion 95 of flat valve 97, as shown especially in FIGURES 2 and 3. The top of cylinder 102 is enclosed by a plate 110 secured to annular peripheral cylinder flange 112 by means for screws 114. An air conduit 116 is suitably secured in an aperture 118 in plate 110 so that compressed air may be introduced into cylinder 102 to apply a force to the piston 104 which pushes pin 106 against flat valve 97, thus tending to turn flat valve 97 counterclockwise in FIGURE 2. It will be noted that stepped walls 84—84' and 86—86' plus edges indicated at 123 and 82' form a seat for flat valve 97 when in the fully closed position of FIGURE 2. A firing chamber 80' is thus formed by the elongated portion 95 of the closed flat valve 97, and walls 82, 84 and 86, and the portion 125 of lower firing unit section 80 which extends below the flat valve, as is especially apparent from FIGURES 2, 3, 5 and 7.

It is noted that piston 104 is designed with an area larger than the area on the firing chamber side of flat valve 97 so that when air of equal pressure is provided in cylinder 102 and firing chamber 80', the flat valve 97 will move to and remain in "closed position" shown in FIGURE 2. It is also noted that if the area of piston 104 is equal to or less than the firing side area of part 95 of flat valve 97 and the air pressure applied to both is equal, the flat valve 97 may likewise be normally urged to "closed position" by disposition of piston operated pin 106 at a greater distance from the hinge 100 of flat valve 97 than the distance of application of net resultant force by compressed air within firing chamber 80' on the firing side of flat valve 97, so that there is a greater moment counterclockwise in FIGURE 2. It is also noted that a combination of both approaches (i.e., relation of area of piston 104 to firing side area of flat valve 97, and disposition of pin 106 to provide a longer moment arm counterclockwise in FIGURE 2) may be utilized to control closure of the flat valve 97 when substantially equal air pressure is applied within compression chamber 80' and cylinder 102.

The rear wall 82 of firing chamber 80' is provided with a threaded aperture 126 for mounting a suitable means for injecting a fuel-air mixture into the firing chamber 80', such means being schematically shown at 128. Fuel-air injection means 128 is suitably supplied with fuel through a conduit 130 and air through a conduit 132, and mixes the same to form a fuel-air mixture, and then injects the fuel-air mixture into firing chamber 80' as desired. Any suitable device can be used for this purpose and the details thereof are not per se a part of the present invention, so that a more detailed description is deemed unnecessary. Also, it is noted that a different arrangement may be substituted altogether; e.g., I may separately supply air to firing chamber 80' with injection of fuel to form an explosive mixture, as described hereinafter with reference to FIGURES 8–9.

A spark plug 138 is mounted in either or both of walls 84 and 86, so that it extends into the firing chamber 80' of each firing unit 22, as shown in FIGURES 1, 2 and 3. When fuel and air are injected into the firing chamber 80' through means 128, and the spark is ignited at plugs 138, there is a resultant explosion which quickly throws the flat valve 97 from closed position (shown in solid line in FIGURE 2) to open position (shown in dotted line in FIGURE 2), whereby the lower surface of the longated part 95 of flat valve 97 is disposed substantially in alignment with lower surface 94' of the upper firing unit subassembly 90. As will be apparent from the drawings, this valve action provides at the forward end of the firing chamber 80' (to the left in FIGURE 2) a narrow throat which is bordered by surfaces 123, 94' and walls 84 and 86 (this throat was closed off by section 99 of the flat valve 97 in closed position). Said throat of the firing chamber 80' extends radially of the engine axis over the rotor blade section 45, as is especially apparent from FIGURES 1 and 3.

Thus, when spark plugs 138 are ignited to explode a fuel-air mixture in firing chamber 80', the exploded gas particles are propelled through the aforementioned throat of the firing chamber in a direction substantially parallel to the surface 94' and the aligned underside of open flat valve section 95. The previously mentioned radially extending blades 47 of rotor 30 are formed with a cross-sectional shape as illustrated in FIGURE 2, and each blade 47 includes a surface 47' which is substantially perpendicular to aforementioned surface 94' and the aligned underside of flat valve section 95 in open position. Hence, the gas discharged from firing chamber 80' is propelled against rotor blade surfaces 47' at an angle of 90° to the maximum extent possible so that the force of inertia of the gas molecules is applied to the rotor blades to maximum extent when the firing unit 22 is fired. The firing chamber 80', flat valve 97, the aforementioned firing chamber throat, and the rotor blades 47, 47' are so designed, and the spark means 138 are so positioned to achieve an optimum locus for the fuel explosion and desired direction of travel of the exploded gas molecules from firing chamber 80' to achieve maximum utilization of the force of interia of the exploded gas particles against the turbine blade surfaces 47'. This force of inertia applied to rotor blade surfaces 47' will cause the rotor 30 to rotate clockwise in FIGURE 1 (and to the left in FIGURE 2) with work output.

In a typical embodiment, the aforementioned throat (at the exit of firing chamber 80' when flat valve 97 is open) is of relatively small size, and is dimensioned according to the size of engine 20. Also, referring to FIGURES 2 and 3, in a typical embodiment, surface 94' and the aligned firing side of flat valve section 95 in open position is at an angle of 10° to 20° with respect to the upper surface 45' of rotor section 45; preferably this angle is about 15°. The angle between rotor blade surfaces 47' and upper rotor blade section surface is substantially equal to the complement of said angle between surfaces 94' and 47'. Other components may be proportioned as desired consistent with the showing and description herein.

Figure 5:
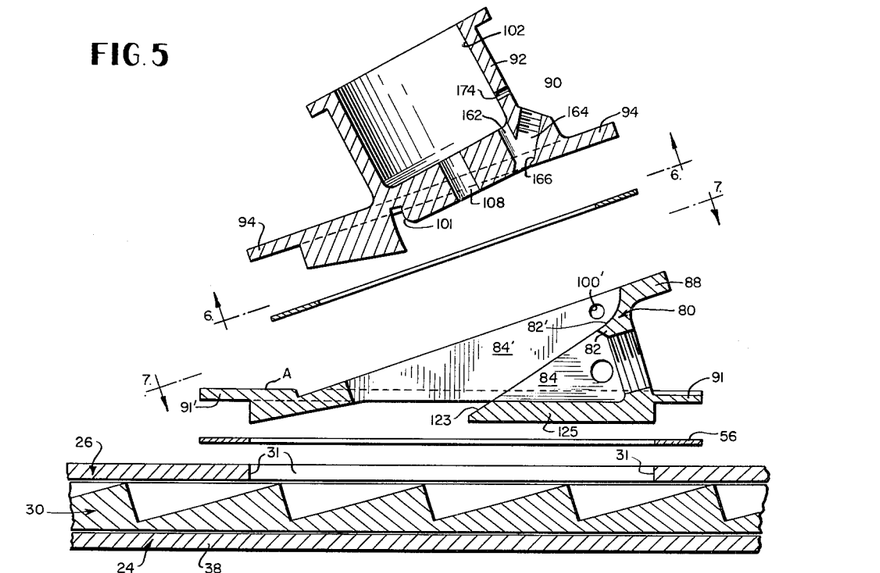
FIGURE 5 is an exploded view of a vertical cross section like that of FIGURE 2, but with some parts omitted for clear illustration of certain components.
Figures 6, 7:
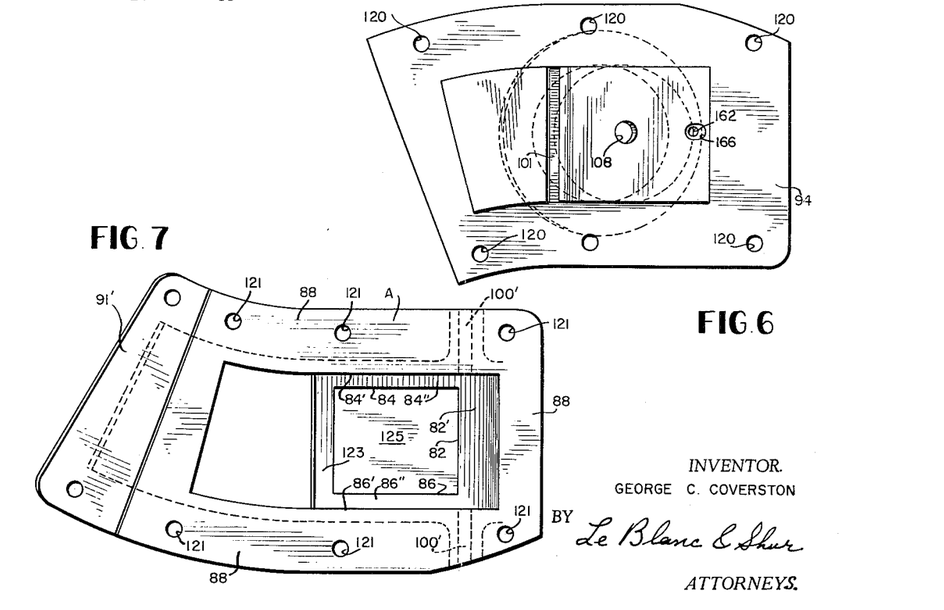
FIGURE 6 is a bottom plan view of a component of the firing unit shown in FIGURE 2, looking along line 6—6 in FIGURE 5.
FIGURE 7 is a top plan view of a component of the firing unit shown in FIGURE 3, looking along line 7—7 in FIGURE 5.

Referring to FIGURES 2 and 5, the main body of upper firing unit section 90 is provided with a pair of intersecting bores 162 and 164 having a ball valve seat 166. Bore 164 accommodates a conventional one-way ball valve including a ball 168 which is normally urged to closed position against seat 166 by a spring 170 which is retained by screw 172. Cylinder 92 is also provided with an aperture 174 below the lowermost position of piston 104. Referring to FIGURE 3, the main body of firing unit section 90 is provided with a pair of intersection bores 176 and 178, these bores being angularly spaced substantially 90 degrees from the ball valve shown in FIGURE 3. Bore 178 is threaded and receives a screw 180 having a point adapted to engage seat 182, thus providing an adjustable needle valve arrangement. It will be apparent from the foregoing that, when flat valve 97 is moved clockwise in FIGURE 2, air compressed by such movement can displace ball 168 and exit from unit 90 through passages 162 and 174, thereby preventing build-up of undesirable back pressure on flat valve 97. It will also be apparent that, when flat valve 97 again moves counterclockwise in FIGURE 2, air may reenter through needle valve aperture 182 to the side of flat valve 97 engaged by piston rod 106.

As will be apparent from FIGURE 1, each of the previously mentioned apertures 78 for a given firing unit 22 is located before the firing chamber 80' of the next firing unit 22 (proceeding clockwise in FIGURE 1). Thus, exploded gases directed into blades 47 of rotor 30 from one of the firing chambers 80' are substantially ejected through the next aperture 78 before those rotor blades pass to the next firing unit 22 where they may receive exploded gases from its firing chamber 89' if the next unit 22 is then fired.

Figure 10:
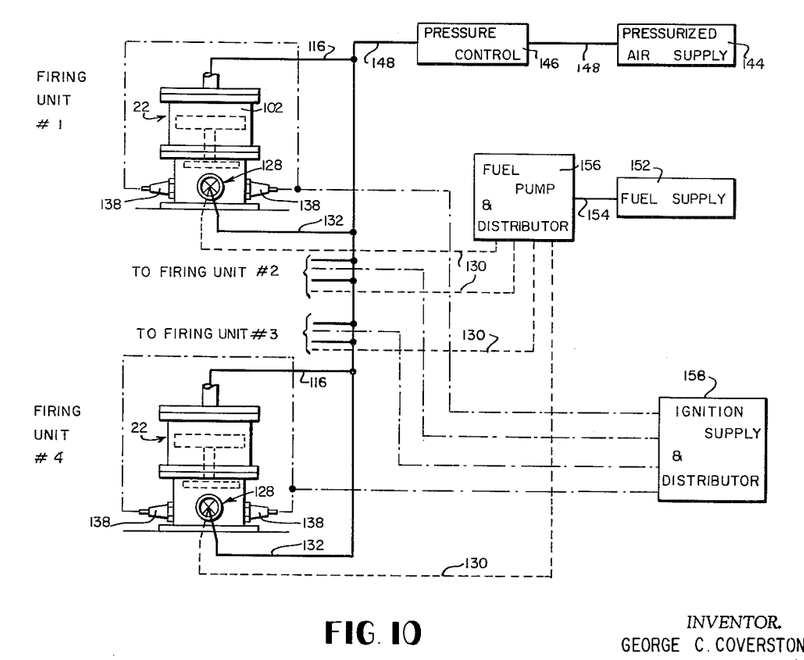
FIGURE 10 is a schematic drawing showing firing units of an inertial force turbine engine according to this invention (e.g., as shown in FIGURES 1–7) plus means for supplying air and fuel to the various firing chambers and igniting the same to drive the explosion inertia turbine rotor.

Referring now to FIGURE 10, this schematically shows an over-all system including suitable fuel and air supply and ignition means for operating the above-described explosion inertia turbine engine shown in FIGURES 1–7.

As previously mentioned, although four firing units 22 are shown in the engine embodiment of FIGURES 1–7 for illustrative purposes, the explosion inertia turbine engine 20 of this invention can be operated with only one firing unit 22, or some other number of multiple firing units 22 as may be desirable for an engine designed to meet certain load conditions. FIGURE 10 schematically shows four firing units 22, each like the firing units 22 of FIGURES 1–7.

A suitable pressurized air supply source generally indicated at 144 is provided for suppling air to the cylinder 102 of each firing unit 22 through conduits 148 and 116, and a suitable pressure control means may be provided in air supply line 148 as schematically indicated at 146, if desired. Air is also passed from the pressurized air supply 144 (via pressure control 146, if desired) through conduit 148, from which the air is in turn continuously supplied through lines 132 to the fuel-air mixing means 128 which injects fuel-air mixture into the firing chamber 80' of each firing unit 22. The source of pressurized air indicated schematically at 144 preferably would be a conventional centrifugal type air compressor directly or indirectly driven by output shaft 34 or 36 of rotor 30; but any other suitable source of pressurized air supply could be used.

The engine 20 is also provided with a suitable commercially available fuel supply means generally indicated at 152, from which fuel is transmitted through conduit 154 to a suitable commercially available fuel pump and distributor means generally indicated at 156. The fuel pump and distributor means 156 transfers fuel under pressure through conduits 130 to the fuel-air mixing and injector means 128 of each of firing units 22 (in sequence, or otherwise, as desired), and the explosive fuel-air mixture is injected into the firing chamber 80' as previously noted.

Then engine 20 is also provided with a suitable spark ignition and distributor means schematically shown at 158. The fuel pump and distributor means 156 and the ignition supply and distributor means 158 can be operated independently of each other or in timed relation to each other by any suitable conventional means, as may be desired for a given engine. The ignition supply and distributor means 158 may be a piezo electric sparking device of a commercially available type, as this is readily adaptable for use with my explosion inertia turbine engine 20 because this engine needs no spark advance. (Since the ignition means 158 and the fuel pump and distributor means 156 are not per se novel parts of the present invention, and adaptability of various types of commercially available devices will be apparent to those skilled in the art in light of this disclosure, further detailed showing and description of fuel means 156 and spark means 158 is believed unnecessary.)

*Description of operation*

For convenient understanding of the invention, the over-all operation of turbine engine 20 will now be described with reference to FIGURES 1–7 and FIGURE 10.

Compressed air at the desired pressure is supplied by pressurized air supply means 144 to conduits 148 and 116, from which compressed air is constantly admitted to the cylinders 102 of each of the firing units 22. The compressed air within the cylinder 102 exerts a force on piston 104 and pin 102, thus exerting a moment on flat valve 97 (counterclockwise in FIGURE 2) pressing that valve to closed position against the valve seat formed by the shoulders 84" and 86" and surfaces 82' and 123. The area of piston 104 is greater than the firing chamber side area of flat valve portion 95, so that the flat valve 97 is thus held in closed position. Air is simultaneously fed to the air-fuel mixing and injecting device 128 of each of firing chambers 80' through lines 148 and 132. Fuel pump and distributor means 156 causes fuel to be fed through lines 130 to each air-fuel mixing and injecting device 128, from which an air-fuel mixture is injected into the closed firing chamber 80' of a given firing unit 22, thereby providing an explosive mixture within the firing chamber 80' in this firing unit 22. The spark plug(s) 138 of the given firing unit 22 are fired by ignition supply and distributor means 158, which is operated as desired. The firing of the spark plug(s) 138 produces an explosion of the air-fuel mixture which rapidly expands the gases in firing chamber 80' and opens the flat valve 97. The exploded gas is projected in a substantially flat stream through the now open throat of the firing chamber 80', in a direction substantially perpendicular to the surface 47' of rotor blades 47 disposed below firing unit aperture 132, due to the above-described construction of the firing chamber, flat valve and rotor blades. This causes the inertial force of the gas propelled from the firing chamber 80' to be applied substantially perpendicular to the surface 47' of the blades of rotor 30, with maximum build-up and capture of the force of inertia of the gas. This inertial forces provides the source of work for driving the rotor 30 and output shafts 34 and 36 of engine 20.

Figure 4:
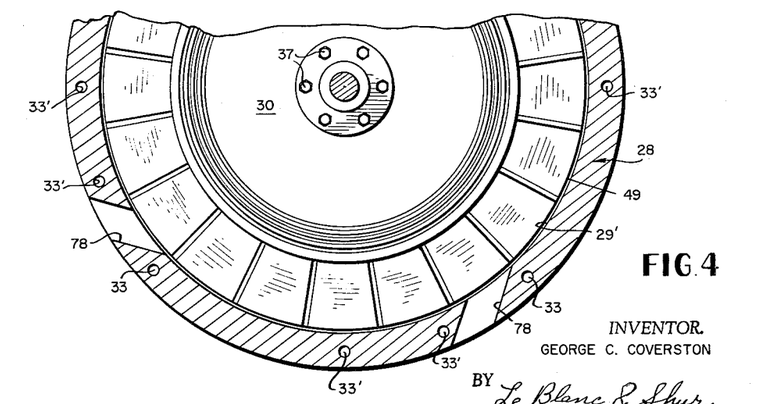
FIGURE 4 shows part of the engine rotor in top plan with the peripheral annular housing member in section, looking along line 4—4 in FIGURE 3.
Figures 8, 9:
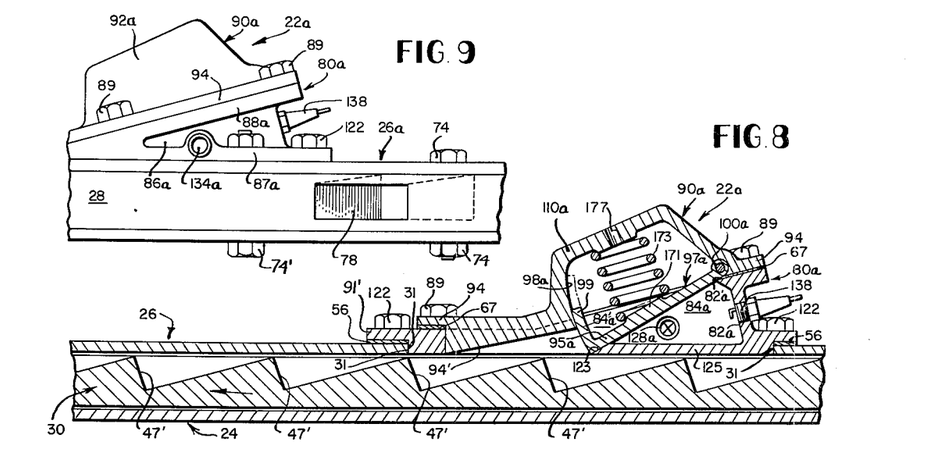
FIGURE 8 is a vertical sectional view of a modification of the explosion inertia turbine engine of FIGURES 1–7, with the section shown being similar to the vertical section in FIGURE 2 (along a line corresponding to 2—2 in FIGURE 1), but illustrating a different form of firing unit.
FIGURE 9 is a fragmentary side elevation view of a portion of the modified explosion inertia turbine engine incorporating the modified independent firing unit shown in FIGURE 8.

In the illustrated embodiment of FIGURES 1–7, the gases from a given firing unit 22 are propelled through the next aperture 78 by a combination of centrifugal force and residual energy of expansion in the gases (see particularly FIGURES 1, 3 and 4, and also FIGURE 9). The gases expelled through the apertures 78 for each of firing units 22 may be carried away by any suitable conduit means, like an exhaust collector ring, or may be used for further work output as discussed in connection with FIGURES 12 and 13. Since the aperture 78 for a given firing unit 22 is located before the next firing unit 22, the gases from the explosion of the preceding firing unit 22 are substantially exhausted from the rotor blades 47 before those turbine blades are acted upon by gases resulting from ignition of a charge in the next ignited firing unit 22.

While the air, fuel and ignition supply can be by any conventional means, the one used as an illustration (128) mixes the fuel with the air before its entry through the intake valve into firing chamber 80' in firing unit 22. When the incoming mixture reaches the compression pressure the intake valve closes injection means 128 off from firing unit chamber 80', and the mixture awaits firing through spark plugs by any conventional means with no relation to the speed of the rotor 30 under a given load condition imposed on the output shafts 34 and 36 of engine 20. After the firing of a given unit 22, the pressure imposed in cylinder 102 on piston 104 will cause pin 106 to close flat valve 97, as previously explained, whereupon the air at compression pressure throws open the inlet valve of unit 128 thus causing it to inject another charge of the air-fuel fmixture to be fired as timed.

Referring to FIGURES 8–9, there is shown therein a modification of the turbine engine of this invention, which is similar to the embodiment of FIGURES 1–7, but is modified in certain particulars as discussed below. In FIGURES 8 and 9, components which are the same as in FIGURES 1–7 are identified with like numerals as in FIGURES 1–7; other components which are comparable to, but modified from, components of the engine in FIGURES 1–7 are indicated, insofar as possible, with like numerals as in FIGURES 1–7 plus the subscript *a*, to avoid undue duplication of description of parts previously described.

Referring specifically now to FIGURES 8 and 9, this embodiment incorporates a modified firing unit generally indicated at 22a, which includes a lower firing unit section 80a and an upper firing unit section 90a. The principal differences between this embodiment and that of FIGURES 1–7 are: (a) a somewhat different mounting arrangement for the flap valve; (b) use of a spring instead of air to normally close the flap valve; and (c) use of a different arrangement for supplying air and fuel to the firing chamber of each firing unit, with a different spark plug mounting.

The lower firing unit section 80a is secured to upper turbine housing 26, and the upper firing unit section 90a is secured to lower section 80a, in like manner as corresponding sections 80 and 90 of firing unit 22 of FIGURES 1–7. (Compare FIGURES 8–9 with FIGURES 1–7 and the foregoing description thereof.)

The lower firing unit section 80a is provided with side walls 84a and 86a and an interconnecting rear wall 82a which includes a portion 82a' forming part of a valve seat together with shoulders formed in side walls 84a and 86a and surface 123, in like manner as in the embodiment of FIGURES 2–7. Side wall 84a is provided with a check valve 128a to which there is connected a conventional air supply fitting. Side wall 86a is provided with a fuel injector means 134a for injecting fuel into the firing chamber 80' of firing unit 22a. To illustrate a variation of the firing chamber arrangement, in the embodiment of FIGURES 8 and 9, the lower firing chamber section 80a has a single spark 138 mounted in the rear wall 82a as shown especially in FIGURE 8.

The upper section 90a of firing unit 22a incorporates a main section 92a having a configuration as illustrated in the drawings and including an internal recess 98a in which a flap valve 97a is pivotally mounted at one end on a transversely extending pin 100a which is mounted in upper section 90a as shown (instead of in the lower section of the firing unit as in the FIGURES 1–7 embodiment). The flap valve 97a is similar to flap valve 97 in the embodiment of FIGURES 2–7. However, flap valve 97a has a circular protrusion 171 on one side to seat one end of a spring 173, which has its other end seated over a like circular protrusion 175 on the inner side of upper wall 110a of section 92a of the upper firing unit portion 90a. (See especially FIGURE 8.) An aperture 177 may be provided in the upper wall 110a to permit passage of air to and from the chamber 98a if deemed necessary or desirable.

Each of check valves 128a for each firing unit 22a is connected to an air supply line in conventional manner as previously indicated, and pressurized air is constantly supplied by any suitable means. (For example, the pressurized air supply and conduits indicated at 144, 146, 148 and 132 in FIGURE 10, can be modified so that each conduit 132 is connected to a check valve 128a on each firing unit 22a.) The check valve 128a in firing unit 22a is designed so that when the pressure inside the firing chamber 80' equals or exceeds the compresed air pressure in the air line connected to this valve (e.g., when the unit 22a is fired as below discussed), gas will be prevented from passing out of the firing chamber 80' and back through the air supply line connected to valve 128a'; whereas when the pressure in firing chamber 80' is lower than the pressure in the air line connected to check valve 128a (e.g., after exploded gases are expelled from firing chamber 80'), the check valve 128a permits air under pressure to pass from its associated air line into the firing chamber 80'. (Various conventional types of suitable check valve constructions will be apparent to those skilled in this art, and the particular check valve used is not per se a part of the present invention, so that a more detailed showing and description thereof is deemed unnecessary.) The wall 86a of each firing chamber 80' has a suitable fuel injector mounted therein at 134a, and this fuel injector 134a is connected to a fuel feed line in conventional manner as previously indicated. (For example, the fuel supply, pump distributor and conduits indicated at 152, 154, 156 and 130 in FIGURE 10 can be modified so that each conduit 130 is connected to fuel injector 134a of each firing unit 22a.) Fuel injector 134 may be one of the commercially available diesel engine internal combustion engine fuel injectors. (Since the particular design of the fuel injector 134a is not part of this invention and various suitable types will be apparent to those skilled in the art, a detailed showing and description thereof is deemed unnecessary.)

The firing unit 22a of FIGURES 8 and 9 is operated in a manner similar to the firing unit 22 of the embodiment of FIGURES 1–7, but with differences as noted: The counter force of spring 173 is utilized to urge flap valve 97a to closed position limited by the valve seat including the shoulders formed in walls 84a and 86a and surfaces 82a' and 123 to form the enclosed firing chamber 80'. Air is fed into the firing chamber 80' via check valve 128a and fuel is injected into chamber 80' by injector 134a to form an explosive mixture which is then ignited by the spark 138. The resultant sudden explosion will open flap valve 97a and the exploded gas particles are propelled in substantially parallel formation perpendicularly against blade surfaces 47' of rotor 30 to utilize the force of inertia of the gases, in like manner as in the embodiment of FIGURES 1–7, described above. When the pressure drops in chamber 80' after firing, the spring 173 will return the flap valve 97' to closed position as shown in FIGURE 8, whereby the firing chamber 80' is again enclosed for repetition of the firing cycle. One or more firing units 22a may be used for a given engine in like manner as firing units 22 in the embodiment of FIGURES 1–7, with modification of the control system of FIGURE 10 as discussed above (and omission of air lines 116 in view of substitution of spring 173 for piston 104 in firing units 22a).

Since an engine constructed with the firing unit 22a per the embodiment of FIGURES 8–9 is otherwise like engine 20 described in detail with reference to FIGURES 1–7, and since the differences between FIGURES 8–9 embodiment have been fully noted, it is believed that the construction and mode of operation of an engine according to FIGURES 8–9 embodiment will be apparent to those skilled in the art, whereby further elaboration thereof is unnecessary.

Figure 11:
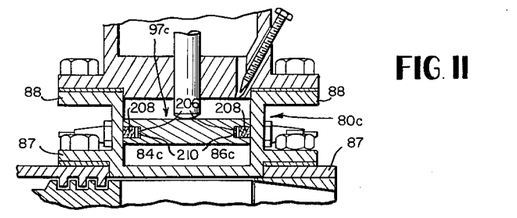
FIGURE 11 is a fragmentary sectional view (similar to that of FIGURE 3) showing a modified, firing unit having a particular flat valve arrangement.
Figures 11A, 12, 13:
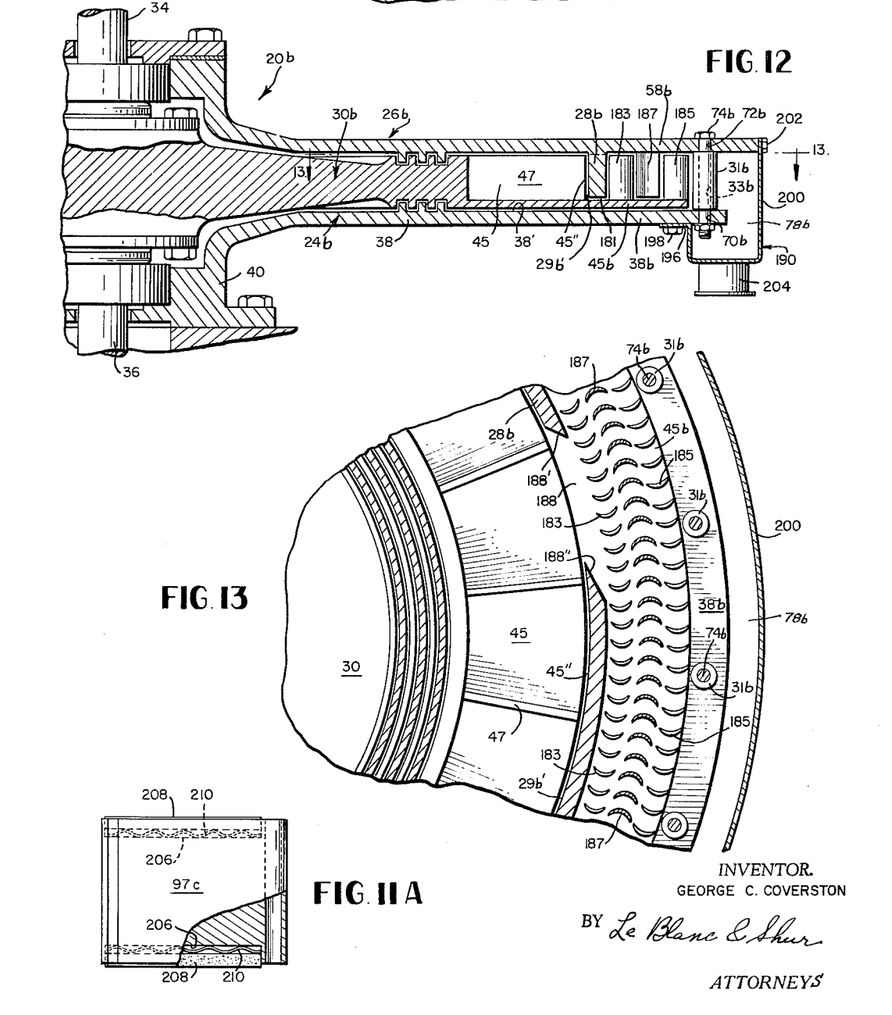
FIGURE 11A is a plan view of the flat valve of the modified firing unit of FIGURE 11, with a portion broken away for clearer illustration.
FIGURE 12 is a partial vertical section similar to that of FIGURE 3, but showing another embodiment of the present invention in which the rotor driven by inertia of the exploded gases also incorporates a velocity stage turbine along its outer periphery to utilize the energy remaining in the gases as they pass from the main rotor section, prior to their exhaust to atmosphere through an annular exhaust collector which is also illustrated in vertical section in this figure.
FIGURE 13 is a fragmentary horizontal cross-section of part of the engine embodiment shown in FIGURE 12, taken along line 13—13 in FIGURE 12.

Referring to FIGURES 11 and 11A, there is shown part of a firing unit which is similar to firing unit 20 of FIGURES 1–7 described above, with some modification as discussed below.

In FIGURES 11–11A, components which are like those in FIGURES 1–7, are identified with like numerals; other components which are comparable to, but modified from, components of the engine in FIGURES 1–7 are indicated insofar as possible with like numerals as in FIGURES 1–7 plus the subscript *c*, to avoid undue duplicate description of parts previously described.

In the modified firing unit 20c of FIGURES 11–11A the flap valve 97c has an alternative construction which eliminates the need for a valve seat (other than seats at front and rear of the valve 97c which correspond to seating surface 82' and 123 in the embodiment of FIGURES 2–7). The inside walls 84c and 86c of lower firing unit section 80c are planar (instead of stepped as in the FIGURES 2–7 embodiment), and the flap valve 97c has its side edges grooved at 206 to receive brushes 208 which are urged against the side walls 84a and 86a by brush springs 210 within grooves 206. Brushes 208 are made of any suitable temperature resistant material which preferably has anti-friction characteristics, e.g., graphite.

This valve and brush construction provides a virtually leak proof construction regardless of the valve position and makes it unnecessary to machine a valve seat in lower firing unit section 80c (as in unit 80 of the FIGURES 2–7 embodiment). Also, this valve construction permits the exploded gas particles to leave the firing chamber in greater volume while avoiding the small turbulence which may be generated in the region of side wall valve seats such as included in the FIGURES 2–7 embodiment). [It is noted that while the firing unit embodiment 22c of FIGURES 11–11A having planar inside walls 84c and 86c may be operated with a flap valve which does not incorporate side brushes 208, the use of such brushes makes the firing unit 22c more efficient.]

Referring to FIGURES 12 and 13, there is disclosed therein another modification of the present invention incorporating an explosion inertia turbine engine like that of FIGURES 1–7 and also incorporating a radical velocity stage turbine along its outer periphery to utilize the energy remaining in the exploded gases prior to their exhaust to atmosphere.

In FIGURES 12–13, components which are like those in FIGURES 1–7, are identified with like numerals; other components which are comparable to, but modified from, components of the engine in FIGURES 1–7 are indicated insofar as possible with like numerals as in FIGURES 1–7 plus the subscript *b*, to avoid undue duplicate description of parts previously described.

From the central axis of shafts 34 and 36 (left of FIGURE 11) to the outer cylindrical periphery 45" of rotor blades 45, 47, the construction of the engine embodiment 20b of FIGURES 12–13 is the same as the construction of engine 20 of FIGURES 1–7. This will be apparent from the like numerals applied to like parts between the axis of shafts 34 and 36 and rotor blade periphery 45". Therefore, to avoid undue repetition, this part of engine 20b which is like engine 20 will not be described again (it being noted, however, that reference can be made to the foregoing description of correspondingly numbered parts in connection with FIGURES 1–7). The part of the engine embodiment 20b of FIGURES 12 and 13 which differs from engine 20 of FIGURES 1–7 will now be described.

The upper rotor housing section generally indicated at 26b is similar to the upper rotor housing section 26 of engine 20 in FIGURES 1–7, but has an additional peripheral annular wall section indicated at 58b and extending outwardly beyond the position of the firing units which are over rotor blade section 45, as will be apparent from FIGURES 12 and 13. The lower rotor housing section 24b is similar to the lower rotor housing section 24 of the FIGURES 1–7 embodiment, but it also has a section 38b, which does not extend as far as section 58b, for passage of exhaust gases as later amplified. The peripheral portions 38b and 58b of rotor housing sections 24b and 26b are secured together and properly spaced from each other by a plurality of cylindrical bushings 31b extending between plate sections 38b and 58b at angular intervals, with bolts 74b passing through aligned apertures 72b, 33b and 70b, as is apparent from FIGURES 12 and 13.

The outer periphery 45" of rotor blade section 45 is bounded by an annular ring 28b which is slightly spaced from rotor periphery 45" to provide a slight clearance 29b'. As shown in FIGURE 12, the annular ring 28b may be formed integrally with the top housing section 26b, extending from the underside thereof concentric with the rotor axis. However, the annular ring 28b does not extend to the inside surface 38' of the lower housing section 24b, but is instead slightly spaced therefrom to provide a slight clearance 181 so that ring 28b does not interfere with movement of an annular plate-like section 45b extending laterally of rotor blade portion 45. The annular plate-like extension 45b is provided with two concentric rings of turbine vanes or blades 183 and 185 extending perpendicularly from section 45b, as shown in FIGURES 12 and 13. The underside of annular plate-like extension 58b of upper rotor housing section 26b is provided with a ring of turbine vanes or blades 187 disposed between vanes 183 and 185. The annular rings of vanes 183 and 185 constitute the moving blades of a radial velocity stage turbine, and the annular ring of blades 187 constitute the intermediate fixed blades of such a turbine.

The ring 28b is provided at angularly spaced intervals with apertures 188 which have sides 188' and 188" disposed at an acute angle to moving inner moving vanes 183.

In operation of engine 20b of FIGURES 12 and 13, work output is recovered from gases exploded in firing units 22 by means of the force of inertia exerted on the blades 47 of rotor blade section 45, as described with reference to engine 20 of FIGURES 1–7. Thus, the portion of engine 20b extending from the shaft axis to the inside of annular ring 28b operates to produce work output from exploded gases in the same manner as engine 20 of FIGURES 1–6. Previously mentioned apertures 188 in ring 28b are located a sufficient angular distance (clockwise in FIGURE 13) from the preceding firing unit 22 to permit optimum "extraction" of work output due to inertial force of gases within this main part of engine 20b before the gases are propelled from the blades 47 through openings 188 in ring 28b. The gases ejected through openings 188 are directed through the inner ring of moving vanes 183, and the kinetic energy of the moving gas particles is thereby imparted to vanes 183 thus providing further work output for the driving of rotor 30b of engine 20b. Then the gases pass from the moving inner ring of vanes 183 through the fixed ring of vanes 187 which direct the gases through the outer moving ring of vanes 185 so that the kinetic energy of the moving gas particles is imparted to vanes 185 to do additional work for driving rotor 30b.

Gases exiting from moving vanes 184 are propelled by centrifugal force and some residual energy of expansion towards the peripheral edges of housing sections 24b and 26b to be exhausted.

The engine 20b is provided with an annular exhaust collector 190 which has a somewhat J-shaped cross-sectional configuration as shown in FIGURE 12 and extends entirely around the outer engine periphery. This annular exhaust collector may be made with an end flange 196 secured to the underside of rotor housing section 24b by a plurality of cap screws 198, with an annular peripheral wall section 200 having its upper edge secured to the periphery of plate extension 58b of upper housing section 26b by a plurality of cap screws 202, as will be apparent from FIGURE 12. The annular exhaust collector ring 190 may be provided with one (or more) exhaust take-off conduit(s) 204, as desired. Exhaust gases from turbine vanes 185 pass through the annular space 78b along the periphery of plate 38b of lower rotor housing section 24b into annular exhaust collector 190 from which they are removed through conduit 204.

It is believed that the construction and mode of operation of the embodiment of FIGURES 12 and 13 will be apparent from the foregoing description and discussion thereof when considered in light of the description of the embodiment of FIGURES 1–7 and 9, whereby further elaboration thereof is deemed unnecessary.

It is to be understood that other arrangements can be substituted for the radial velocity stage turbine in the modification of FIGURES 12–13 for secondary recovery of residual energy in the gases ejected from the main part of the engine corresponding to the novel explosion inertia turbine engine of FIGURES 1–7 according to my invention.

It will be apparent from the foregoing that this invention provides a novel engine including means for grouping and directing the gas particles of an exploding fuel so as to utilize their impact on a turbine rotor. Also the novel engine of this invention includes a novel explosion chamber outlet valve which permits the exploded gases to leave the firing chamber in practically parallel formation. It includes a design of the firing chamber, valve and throat which starts the exploded particles in one direction and keeps them on a parallel path until they reach their limit of expansion with a novel turbine rotor receiving their impact for its propulsion upon notches which are practically at right angles to their parallel paths. By exposing maximum flat rotor blade surface at right angles to the course of parallel gas particles all of their force of inertia is realized.

The engine of this invention also includes a novel flexible pneumatic valve closing device, which, by using air at compression pressure, adapts itself to any changes of compression in the explosion chamber, allowing high compression where economy and power are needed and low compression for tempering or muting the force of the impact while idling. The speed of the rotor is comparatively slow, being limited by the peak load.

Further, a modified embodiment of the invention includes an explosion chamber outlet valve spring, which, as an alternate to the flexible pneumatic one mentioned above, can be used where the compression pressure is constant and where maintenance, cost of manufacture and greater simplicity are considerations.

It is noted that while the spark must be applied at or near the base of the explosion chamber in proper relation to the flap valve, the air and fuel entrance may be located in any position thereon governed by the make, size and adaptability of the air or fuel feed means used and the size and intended use of the engine.

Terms such as "upper" and "lower" are used in these descriptions merely for convenience, as the engine will operate with its rotor horizontal or at any angle.

This application is a continuation in part of my copending application S.N. 189,407, filed April 23, 1962.

The invention may be embodied in other specific forms without departing from the spirit or essential characteristics thereof. The disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gas turbine engine comprising a turbine rotor and means supporting same for rotation about a fixed axis, a firing unit and means supporting said unit adjacent the rotor, said unit defining a combustion chamber having a movable valve forming a part of the wall of said chamber on the side of said chamber remote from said rotor, said valve when open serving in conjunction with other portions of said combustion chamber to define a constricted throat directed generally tangentially with respect to the rotor, means supplying gaseous fuel under pressure into said chamber, means for igniting said fuel within the combustion chamber, resiliently yieldable means constantly urging the valve toward closed position with a force in excess of the opening force exerted thereon by the fuel under said pressure, but less than the force exerted thereon by ignition of the fuel.

2. A gas turbine engine as defined in claim 1 wherein said valve is disposed for opening movement in a direction away from said rotor.

3. A gas turbine engine as defined in claim 1 in which a fixed wall portion of said combustion chamber and also said restricted throat are disposed in contiguous relation to the surface of revolution generated by the rotor, and the opening movement of said valve is in a direction away from said surface of revolution.

4. A firing unit for a gas turbine engine, said unit defining a combustion chamber having a movable valve forming a part of the wall of said chamber, said valve when open serving in conjunction with other portions of said combustion chamber to define a constricted throat for directing the ignited gaseous fuel out of the chamber in a narrow stream, means for supplying gaseous fuel under pressure into said chamber, means for igniting said fuel within the combustion chamber, and resiliently yieldable means constantly urging the valve toward closed position with a force in excess of the opening force exerted by fuel prior to its ignition, but less than the force exerted thereon by the ignited fuel.

5. A firing as defined in claim 4 in which said resiliently yieldable means constitutes a spring.

6. A firing unit as defined in claim 4 which includes means responsive to changes in the pressure of fuel supplied to said chamber for causing proportional variations in the closing force exerted on the valve by said resiliently yieldable means.

7. A firing unit as defined in claim 4 in which said resiliently yieldable means comprises a cylinder having a piston movable therein in response to fluid pressure within the cylinder, and means coupling said piston to said valve to transmit a closing force to the valve.

8. A firing unit as defined in claim 7 including means for transmitting the pressure of said gaseous fuel to the fluid within said cylinder, to maintain the valve operative despite variations in the pressure of said fuel.

9. A firing unit as defined in claim 8 in which said coupling means between the piston and valve comprises a piston rod fixed to the piston, with a free end abutting against said valve.

10. A firing unit as defined in claim 8 in which said valve is pivoted to the firing unit for swinging movement about said pivot between its open and closed positions, and said pressure transmitting means is connected to the valve at a location so spaced from said pivot as to transmit the force from said piston to the valve at a mechanical advantage sufficient to overcome the pressure of unignited fuel acting on the valve.

11. A firing unit as defined in claim 7 in which the area of said piston exposed to the fluid pressure is greater than the area of said valve, whereby the force exerted by fluid pressure on the piston will exceed the opening force exerted on said valve by the fuel under pressure in said chamber.

References Cited by the Examiner
UNITED STATES PATENTS

| | | | |
|---|---|---|---|
| 800,684 | 10/1905 | Schneider | 60—39.44 |
| 1,207,666 | 12/1916 | Tompkins. | |
| 2,608,058 | 8/1952 | Geeraert | 60—39.38 X |

OTHER REFERENCES

"The American Inventor," April 1960, vol. 15, No. 4, page 101.

MARK NEWMAN, *Primary Examiner.*

JULIUS E. WEST, ABRAM BLUM, *Examiners.*

R. J. GOMEZ, *Assistant Examiner.*